US008655773B1

(12) United States Patent
Fasoli et al.

(10) Patent No.: US 8,655,773 B1
(45) Date of Patent: Feb. 18, 2014

(54) GEO-LOCATION BASED UNDERWRITING

(75) Inventors: Jonathan David Fasoli, Aliso Viejo, CA (US); William Michael Dorsch, De Pere, WI (US); Amy M. Kerman, Mountain View, CA (US); Brandon Gador, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/359,324

(22) Filed: Jan. 26, 2012

(51) Int. Cl.
*G06Q 40/00* (2012.01)

(52) U.S. Cl.
USPC ............... 705/38; 705/39; 705/40; 705/44

(58) Field of Classification Search
USPC .......................... 705/38, 39, 40, 44
See application file for complete search history.

(56) References Cited

U.S. PATENT DOCUMENTS

| | | | | |
|---|---|---|---|---|
| 7,403,922 | B1 * | 7/2008 | Lewis et al. ............... | 705/38 |
| 7,620,596 | B2 * | 11/2009 | Knudson et al. ........... | 705/38 |
| 7,809,650 | B2 * | 10/2010 | Bruesewitz et al. ........ | 705/64 |
| 7,865,427 | B2 * | 1/2011 | Wright et al. .............. | 705/38 |
| 7,899,712 | B2 * | 3/2011 | May et al. .................. | 705/26.1 |
| 7,941,379 | B1 * | 5/2011 | Newstadt et al. ........... | 705/64 |
| 7,962,405 | B2 * | 6/2011 | Sgaraglio et al. .......... | 705/39 |
| 7,970,701 | B2 * | 6/2011 | Lewis et al. ............... | 705/38 |
| 8,019,678 | B2 * | 9/2011 | Wright et al. .............. | 705/38 |
| 8,090,648 | B2 * | 1/2012 | Zoldi et al. ................. | 705/38 |
| 8,244,629 | B2 * | 8/2012 | Lewis et al. ............... | 705/38 |
| 8,255,325 | B2 * | 8/2012 | May et al. .................. | 705/40 |
| 8,321,341 | B2 * | 11/2012 | Nandy ........................ | 705/39 |
| 2002/0099649 | A1 * | 7/2002 | Lee et al. ................... | 705/38 |
| 2002/0194119 | A1 * | 12/2002 | Wright et al. .............. | 705/38 |
| 2003/0069820 | A1 * | 4/2003 | Hillmer et al. ............ | 705/35 |
| 2003/0187759 | A1 * | 10/2003 | Arthus et al. .............. | 705/30 |
| 2003/0187765 | A1 * | 10/2003 | Sgaraglio ................... | 705/35 |
| 2003/0187778 | A1 * | 10/2003 | Sgaraglio et al. .......... | 705/38 |
| 2003/0187782 | A1 * | 10/2003 | Sgaraglio et al. .......... | 705/39 |
| 2003/0187783 | A1 * | 10/2003 | Arthus et al. .............. | 705/39 |
| 2003/0229587 | A1 * | 12/2003 | Arthus et al. .............. | 705/39 |
| 2005/0021738 | A1 * | 1/2005 | Goeller et al. ............. | 709/224 |
| 2007/0226132 | A1 * | 9/2007 | Sgaraglio et al. .......... | 705/38 |
| 2007/0265986 | A1 * | 11/2007 | Sgaraglio et al. .......... | 705/79 |
| 2008/0140576 | A1 * | 6/2008 | Lewis et al. ............... | 705/67 |
| 2008/0288392 | A1 * | 11/2008 | Sgaraglio et al. .......... | 705/38 |
| 2008/0301040 | A1 * | 12/2008 | Knudson et al. ........... | 705/39 |
| 2009/0012898 | A1 * | 1/2009 | Sharma et al. ............. | 705/44 |
| 2009/0248548 | A1 * | 10/2009 | Obermeyer ................ | 705/28 |
| 2009/0319425 | A1 * | 12/2009 | Tumminaro et al. ...... | 705/42 |
| 2009/0327135 | A1 * | 12/2009 | Nguyen et al. ............. | 705/44 |
| 2010/0169212 | A1 * | 7/2010 | Paintin ....................... | 705/40 |
| 2010/0293065 | A1 * | 11/2010 | Brody et al. ............... | 705/26 |
| 2010/0293106 | A1 * | 11/2010 | Rhoads et al. ............. | 705/330 |

(Continued)

*Primary Examiner* — Sara C Hamilton
(74) *Attorney, Agent, or Firm* — Osha Liang LLP (57) ABSTRACT

A method for processing financial requests, including: identifying an approval criterion and a predefined proximity for approving financial requests; receiving, from a mobile device of a merchant, a financial request including merchant-provided data, where the merchant-provided data includes an address of the merchant; receiving a location coordinate from the mobile device; determining, by a computer processor, that the location coordinate is within the predefined proximity of the address of the merchant; identifying, by the computer processor, at least a portion of the merchant-provided data required to evaluate the approval criterion; evaluating, by the computer processor, the approval criterion using the portion of the merchant-provided data; determining, based on evaluating the approval criterion, that the approval criterion is satisfied; and approving the financial request in response to determining that the location coordinate is within the predefined proximity and determining that the approval criterion is satisfied.

24 Claims, 7 Drawing Sheets

(56) References Cited

U.S. PATENT DOCUMENTS

| | | | |
|---|---|---|---|
| 2011/0047044 A1* | 2/2011 | Wright et al. | 705/26.35 |
| 2011/0047075 A1* | 2/2011 | Fourez | 705/44 |
| 2011/0137796 A1* | 6/2011 | Tullis | 705/44 |
| 2011/0137804 A1* | 6/2011 | Peterson | 705/77 |
| 2011/0238474 A1* | 9/2011 | Carr et al. | 705/14.23 |
| 2011/0241872 A1* | 10/2011 | Mahaffey | 340/539.13 |
| 2011/0276468 A1* | 11/2011 | Lewis et al. | 705/38 |
| 2011/0320347 A1* | 12/2011 | Tumminaro et al. | 705/39 |
| 2012/0143690 A1* | 6/2012 | Hansen et al. | 705/14.58 |

* cited by examiner

GEO-LOCATION BASED UNDERWRITING

BACKGROUND

Traditionally, the vast majority of merchant transactions were limited to brick and mortar retail establishments. With the advent of the Internet and electronic commerce, merchant services have grown to encompass a wide variety of online and remote functionality. The new functionality provided by Internet-enabled computing devices has led to innumerable benefits as well as risks for all parties involved.

Mobile devices have skewed the traditional merchant-consumer relationship even further by allowing almost anyone to act as a merchant. Mobile devices such as smartphones and tablet computers provide location-based services and real-time connectivity. Users of an online auction website may buy, sell, and accept various forms of payment with minimal effort. At the same time, users may comparison shop, purchase a sale item on a favorite website, or search for a nearby merchant without being tethered to a Wifi connection or a particular location.

As a result, modern financial institutions face a host of unprecedented security risks. For example, identity theft and online financial fraud lead to substantial losses for consumers, merchants, and financial institutions alike. The relative anonymity provided by the Internet is naturally conducive to financial fraud. Malware such as viruses, trojans, and worms, coupled with traditional instruments of financial fraud, have become a pervasive threat to personal privacy and security. In addition to the obvious financial losses associated with such threats, a single security lapse involving the loss of consumer data can be enough to permanently impact the reputation and goodwill of a merchant or financial institution.

SUMMARY

In general, in one aspect, the invention relates to a method for processing financial requests. The method includes: identifying an approval criterion and a predefined proximity for approving financial requests; receiving, from a mobile device of a merchant, a financial request including merchant-provided data, wherein the merchant-provided data includes an address of the merchant; receiving a location coordinate from the mobile device; determining, by a computer processor, that the location coordinate is within the predefined proximity of the address of the merchant; identifying, by the computer processor, at least a portion of the merchant-provided data required to evaluate the approval criterion; evaluating, by the computer processor, the approval criterion using the portion of the merchant-provided data; determining, based on evaluating the approval criterion, that the approval criterion is satisfied; and approving the financial request in response to determining that the location coordinate is within the predefined proximity and determining that the approval criterion is satisfied.

In general, in one aspect, the invention relates to a system for processing financial requests. The system includes a computer processor and an underwriting module executing on the computer processor and configured to: identify an approval criterion and a predefined proximity for approving financial requests; receive, from a mobile device of a merchant, a financial request including merchant-provided data, wherein the merchant-provided data includes an address of the merchant; receive a location coordinate from the mobile device; determine that the location coordinate is within the predefined proximity of the address of the merchant; identify at least a portion of the merchant-provided data required to evaluate the approval criterion; evaluate the approval criterion using the portion of the merchant-provided data; determine, based on evaluating the approval criterion, that the approval criterion is satisfied; and approve the financial request in response to determining that the location coordinate is within the predefined proximity and determining that the approval criterion is satisfied.

In general, in one aspect, the invention relates to a non-transitory computer-readable storage medium storing instructions for processing financial requests. The instructions include functionality to: identify an approval criterion and a predefined proximity for approving financial requests; receive, from a mobile device of a merchant, a financial request including merchant-provided data, wherein the merchant-provided data includes an address of the merchant; receive a location coordinate from the mobile device; determine that the location coordinate is within the predefined proximity of the address of the merchant; identify at least a portion of the merchant-provided data required to evaluate the approval criterion; evaluate the approval criterion using the portion of the merchant-provided data; determine, based on evaluating the approval criterion, that the approval criterion is satisfied; and approve the financial request in response to determining that the location coordinate is within the predefined proximity and determining that the approval criterion is satisfied.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for processing financial requests. In general, embodiments of the invention receive a financial request including an address of a merchant from a mobile device of the merchant. A location coordinate is also received from the mobile device. It is determined whether the location coordinate is within a predefined proximity of the address of the merchant. If the location coordinate is within the predefined proximity of the address and/or one or more approval criteria are satisfied, the request is approved. If the location coordinate is not within the predefined proximity of the address and/or one or more approval criteria are not satisfied, the request is either declined (i.e., denied) or the processing risk (and processing rate) associated with the transaction is increased to reflect the potentially abnormal request scenario.

Figure 1:
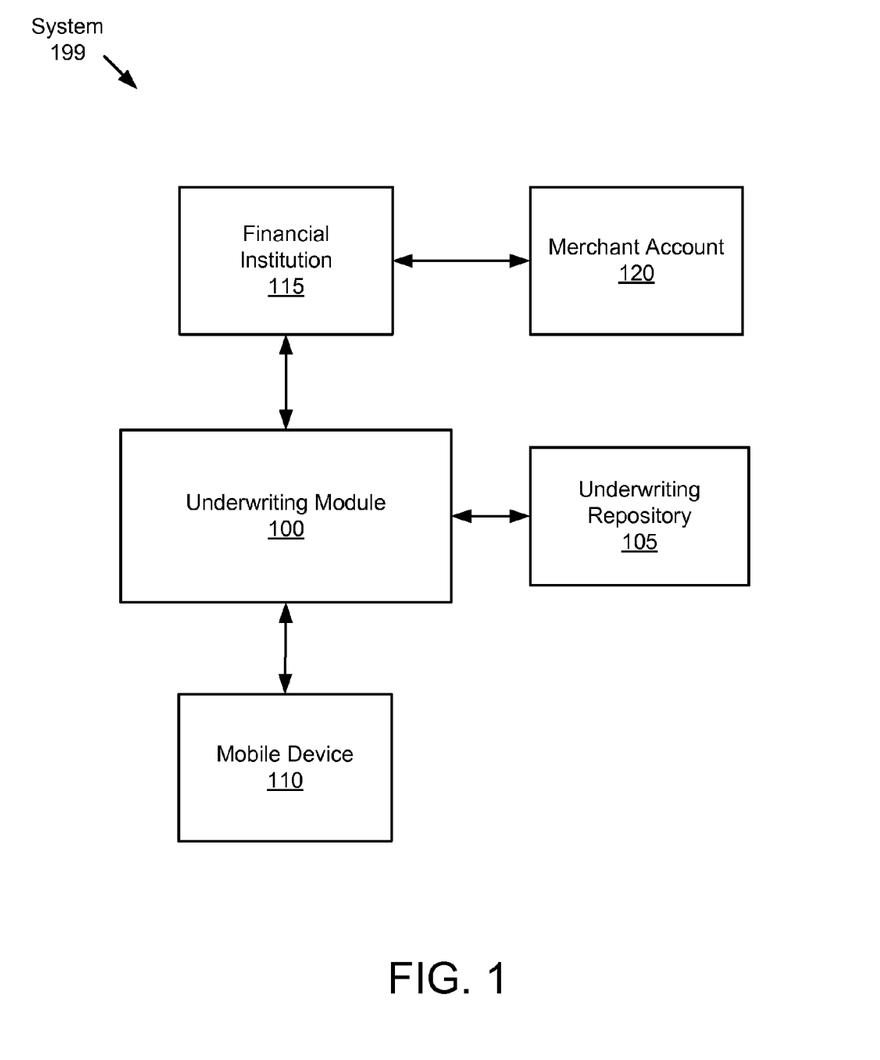
FIG. 1 shows a schematic diagram in accordance with one or more embodiments of the invention.

FIG. 1 shows a system (199) in accordance with one embodiment of the invention. As shown in FIG. 1, the system includes multiple components such as an underwriting module (100), an underwriting repository (105), a mobile device (110), a financial institution (115), and a merchant account (120). The components of the system may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the underwriting module (100) is a software application or a set of software applications executing on one or more hardware processors. The software application may be a web application in a server of a data center and/or a cloud computing application in a network distributed system. Alternatively, the underwriting module (100) may be a software application residing in a standalone computing device (e.g., a desktop computer). In one or more embodiments of the invention, the underwriting module (100) is integrated within or operatively connected to an email application, a payroll application, a financial management application (FMA), or other type of application.

In one or more embodiments of the invention, the underwriting module (100) includes functionality to receive a financial request from the mobile device (110). The financial request may be any request related to a financial account or transaction. Examples of a financial request may include, but are not limited to, a request to approve a payment from a consumer to a merchant, a request to create a new financial account (e.g., a merchant account, a personal checking account, etc.), a request for a personal or business line of credit, and an identity verification or authentication request for any party in a financial transaction, a request for a cash advance on a check made out to a user of the mobile device (110), or any other request associated with a financial account or transaction.

In one or more embodiments of the invention, the financial request includes merchant-provided information, such as an address of a merchant, a name of a merchant, a telephone number of a merchant, a requested maximum transaction amount, an estimated monetary amount provided by a party to the financial request (e.g., an estimated monthly transaction amount, an estimated average transaction amount), identifying information of a merchant or consumer, and/or an authentication token or equivalent (e.g., a digital signature or encrypted file authenticating the merchant). In one or more embodiments of the invention, the request includes one or more transmissions of related data (e.g., merchant-provided data) which may be received by the underwriting module (100) over any length of time and in any number of segments.

In one or more embodiments of the invention, the financial request includes mobile device criteria. The mobile device criteria may be used to evaluate one or more approval criteria and/or to authenticate a party to the financial request. Examples of mobile device criteria include, but are not limited to, a phone number of the mobile device (110), an internet protocol (IP) of the mobile device (110), an account number of a user's financial account stored on the mobile device (110), and/or any other data stored on the mobile device (110).

In one or more embodiments of the invention, the underwriting module (100) includes functionality to perform pre-application underwriting of the financial request and/or post application underwriting of the financial request. Pre-application underwriting is any processing of a request including an application for a new financial account. Post-application underwriting is any processing of a financial request involving an existing financial account. For example, the underwriting module (100) is configured to process a request for a new merchant account (120). In another example, the underwriting module (100) is configured to receive a request from an existing merchant for approval of a transaction involving an existing merchant account (120).

In one or more embodiments of the invention, the mobile device (110) includes a mobile payment processing application (not shown). The mobile payment processing application may be configured to receive payment from one or more customers on behalf of a user or owner of the mobile device (e.g., a merchant) upon creation of a new merchant account (120). In one or more embodiments of the invention, the mobile payment processing application is configured to utilize a card processing device (not shown) operatively connected to the mobile device (110). The card processing device may be a terminal configured to read a payment card or other means of payment used in a financial transaction. The mobile device may be configured to generate financial transactions involving touch-less payments or wired transfers via auxiliary cables, USB cables or other mobile-to-mobile communication devices, in accordance with various embodiments of the invention. Examples of touch-less payments may include, but are not limited to, near field communication (NFC) payment transfers, Bluetooth enabled payment transfers, short message service (SMS) enabled payment transfers, radio-frequency identification (RFID) enabled payment transfers, and email-based payment transfers.

The mobile payment processing application may be configured to create the financial request and to send the financial request to the underwriting module (100) using any data transmission protocol. The mobile payment processing application may be configured to establish a secure communication channel with the underwriting module (100) in order to securely transmit the financial request and/or any related data. In one or more embodiments of the invention, the mobile device (110) is configured to submit a request to create a traditional merchant account (120) to the underwriting module (100). A traditional merchant account (120) may be any merchant account used in the processing of financial transactions not originating from a mobile device (110).

In one or more embodiments of the invention, the underwriting module (100) includes functionality to receive one or more location coordinates from the mobile device (110). The location coordinate may be any geographic or relative coordinate identifying a location of the mobile device. Examples of a location coordinate may include, but are not limited to, a global positioning system (GPS) coordinate, a World Geodetic System (WGS) coordinate, a latitude/longitude coordinate, a name of a city, county, state, country, landmark, address, or other location identifier. Thus, in one or more embodiments of the invention, the location coordinate is simply a name of a location identified by the mobile device. The location may be the current location of the mobile device, and may be identified using cellular triangulation, multilateration, mobile positioning, and/or any method of network-based, handset-based, SIM-based, or hybrid mobile phone tracking.

In one or more embodiments of the invention, the underwriting module (100) includes functionality to define an approval criterion. An approval criterion is any condition for approving the financial request. The underwriting module (100) may evaluate the condition in order to determine whether or not the condition is satisfied. If the underwriting module (100) determines that one or more relevant or required conditions are satisfied, the financial request may be approved. If the condition is not satisfied, the underwriting module (100) may decline the request and/or flag the request for a follow-up. The condition may require merchant-provided information, mobile device information, consumer information, and/or any other external data in order to be evaluated. In one or more embodiments of the invention, if the financial request does not include the necessary information to evaluate a required approval criterion, the underwriting module (100) declines the financial request. In one or more embodiments of the invention, if the financial request does not include the necessary information to evaluate a required approval criterion, the underwriting module (100) may suspend the transaction until further authorization is provided by the merchant, the merchant account (120), the mobile device (110) or any other entity available to authorize the transaction. The underwriting module (100) may also be configured to flag an incomplete financial request for follow-up. Declining a financial request may be an indication of potential fraud or high risk of financial loss for the merchant and/or another party to the financial request, in accordance with various embodiments of the invention.

In one or more embodiments of the invention, the underwriting module (100) includes functionality to identify data required to evaluate an approval criterion in a third party application. The third party application may be a payroll application, a financial management application (FMA), a tax preparation application, a payment processing application, an online or mobile banking application, or any other authorized application. In one example, the approval criterion requires that any data identified within the third party application be sent to a customer representative for review. In another example, the approval criterion requires searching the third party application for a user account corresponding to an applicant for a new merchant account. In this example, if the underwriting module (100) identifies a user account of the third party application, the approval criterion is satisfied and the financial request is approved.

In one or more embodiments of the invention, the underwriting module (100) includes a user interface configured to obtain input from a user. The user interface may define one or more approval criteria in response to input from the user, and/or may enable/disable/add/modify/delete one or more criteria in response to user input. The underwriting module (100) may be configured to receive one or more approval criteria from a third party software application or other entity. For example, the underwriting module (100) may receive definitions of approval criteria from the financial institution (115), the mobile device (110), or a server application communicatively connected to the underwriting module (100).

Examples of an approval criterion may include, but are not limited to, a requirement that a merchant-provided average transaction amount is less than a predefined maximum amount, a requirement that a merchant-provided telephone number matches a telephone number of the mobile device (110), a requirement that a chargeback rate of the first merchant is less than a predefined maximum chargeback rate, a requirement that a name of the first merchant not reside within a blacklist of banned merchants, a requirement that the address of the first merchant reside outside of a predefined geographic location, a requirement that a merchant-provided maximum cumulative transaction amount per unit time is less than a predefined maximum amount, a requirement that a transaction type selected by the first merchant is not in a plurality of restricted transaction types, a requirement that a merchant-provided telephone number match a telephone number of the mobile device (110), a requirement that a merchant-provided address match an address identified by the underwriting module (100) based on an IP address of the mobile device (110), and a requirement that a credit score of the first merchant is greater than a minimum allowable credit score. In one example, the underwriting module (100) is configured to evaluate an approval criterion requiring that a payer not be identified within a national criminal file (NCF) database. In this example, the underwriting module (100) queries the NCF database with identifying information of the payer. Upon determining that the payer is not identified within the NCF database, the underwriting module (100) determines that the approval criterion is satisfied and approves the request.

In one or more embodiments of the invention, the underwriting module (100) includes functionality to define a predefined proximity for approving financial requests. The predefined proximity may be a distance from one or more predefined addresses (e.g., 50 feet, 25 yards, 1 kilometer, etc.). In one or more embodiments of the invention, the underwriting module (100) evaluates an approval criterion requiring that a location of the mobile device (110) (calculated using one or more location coordinates) reside within the predefined proximity of a predefined address (e.g., the merchant's address or place of business).

In one or more embodiments of the invention, the underwriting module (100) includes functionality to determine whether one or more location coordinates are within a predefined proximity of a predefined address (e.g., an address of a merchant). The underwriting module (100) may be configured to select a single point or coordinate to represent the predefined address, or may select multiple points or locations to represent boundaries of the predefined address. Thus, in one or more embodiments of the invention, the underwriting module (100) compares the predefined proximity to the multiple points, vectors, and/or other boundaries of the predefined address as defined by an approval criterion. The approval criterion may require, if multiple coordinates are received from the mobile device (110), that an average distance of the multiple coordinates to the predefined address be less than the predefined proximity. The underwriting module (100) may be configured to calculate each distance from the coordinate to a closest point or boundary defining the address. Any method of calculating a distance between one or more location coordinates and an address may be used, in accordance with various embodiments of the invention.

In one or more embodiments of the invention, the underwriting module (100) includes functionality to identify at least a portion of the merchant provided data required to evaluate an approval criterion. The approval criterion may require that the merchant provided data include one or more authentication credentials (e.g., a username, password, employer identification number (EIN), etc.) or may require that certain monetary amounts fall within a specified range or threshold. For example, if the approval criterion requires that the merchant provide an answer to a challenge question posed by the underwriting module (100), the underwriting module (100) may identify the answer within the merchant-provided data. In another example, an approval criterion requires that an industry selected by the merchant for a new merchant account not reside within a predefined list of banned or limited industries. If the industry selected by the merchant is identified as a banned industry, the underwriting module (100) is configured to decline the financial request. If the industry selected by the merchant is identified as a limited industry, the underwriting module (100) is configured to flag the financial request for follow-up. In this example, the underwriting module (100) identifies, within the merchant-provided data, the industry as "Casino/Gambling." The underwriting module (100) then obtains the list of banned industries and determines that "Casino/Gambling" resides within the list. As a result (in this example), the underwriting module (100) declines the financial request.

In one or more embodiments of the invention, the underwriting module (100) includes functionality to evaluate one or more approval criteria. Initially, the underwriting module (100) may identify one or more criteria which are applicable to the financial request. An approval criterion may be defined as being applicable to financial requests originating from a specified geographic location, financial requests of a specified type (e.g., account creation requests, transaction approval requests, high dollar amount requests, etc.), financial requests corresponding to a specified product category (e.g., consumer goods, commercial goods, jewelry, automotive products, etc.), and/or any other category or grouping of financial requests, in accordance with various embodiments of the invention. After assembling the list of applicable approval criteria, the underwriting module (100) may proceed to evaluate the criteria. In one or more embodiments of the invention, upon determining that one or more approval criteria are not satisfied, the underwriting module (100) declines the financial request without completing evaluation of any remaining criteria.

In one or more embodiments of the invention, the underwriting module (100) includes functionality to approve a financial request in response to determining that one or more location coordinates is within the predefined proximity of a merchant address. The underwriting module (100) may also be configured to approve the financial request further based on one or more approval criteria being satisfied. In one or more embodiments of the invention, upon approving the financial request, the underwriting module (100) may be configured to send a notification of the approval (e.g., in a short message service (SMS), email, or other type of message) to the mobile device (110) and/or one or more other entities (e.g., email addresses) identified in the merchant-provided data. The underwriting module (100) may also be configured to send a request to the financial institution (115) to create a new financial account (e.g., merchant account (120)) upon approving the financial request. In one or more embodiments of the invention, the underwriting module (100) is an intermediary service provider and may be configured to notify any number of third parties or entities upon approval or denial of financial requests.

In one or more embodiments of the invention, the underwriting module (100) includes functionality to flag a financial request for a follow-up. The financial request may be flagged after being declined by the underwriting module (100). Flagging a request for follow-up may include creating a record in the underwriting repository (105), modifying a record in the underwriting repository (105), and/or scheduling a follow-up telephone, email, text message, or other correspondence to a party to the financial request (e.g., an applicant for a new financial account). In one example, the underwriting module (100) identifies a record corresponding to the applicant in the underwriting repository (105). The underwriting module (100) adds a flag to the record to indicate that a follow-up is necessary. Continuing the example, the addition of the flag triggers a notification to be sent to a server application of a customer service center. In response to the notification, the server application initiates a call from a customer service representative to the applicant. In another example, the underwriting module (100) conditionally approves the financial request and also flags the request for a follow-up by updating a record in the underwriting repository (105). In this example, the underwriting module (100) contacts the applicant directly by placing an automated call to the mobile device (110) using an interactive voice response (IVR) system operatively connected to the underwriting module (100). The IVR system prompts the user of the mobile device (110) to answer one or more challenge questions (e.g., requesting the user to enter identifying information of the user or merchant). Upon receiving correct answers to the challenge questions, the underwriting module (100) removes a hold on the financial request and modifies the conditional approval to indicate that the request is finally approved.

In one or more embodiments of the invention, the underwriting module (100) includes functionality to create a new financial account in response to approving a financial request. For example, a new merchant account (120) may be created by the underwriting module (100) or may be created by the financial institution (115) in response to an approval message sent by the underwriting repository. Examples of a financial account may include, but are not limited to, a merchant account for a seller of goods or services, a personal checking account, a home equity line of credit, a business line of credit, and/or any other type of financial account, in accordance with various embodiments of the invention.

In one or more embodiments of the invention, the underwriting module (100) includes functionality to modify a transaction authorization code (e.g., a credit card authorization code) to indicate that the financial request is approved. Thus, the underwriting module (100) may modify the authorization code and relay the modified code to the mobile device (110) to indicate that both the payment account (e.g., the credit card) and the underwriting analysis are approved.

In one or more embodiments of the invention, the underwriting module (100) includes functionality to conditionally approve the financial request. The conditional approval may indicate that one or more requirements must be satisfied prior to obtaining a final approval. Thus, the underwriting module (100) may be configured to send a notification of the additional requirements to the mobile device (110), the financial institution (115), and/or any other authorized entity. In one or more embodiments of the invention, the underwriting module (100) includes a web application configured to accept input from one or more parties to the financial transaction and/or one or more authorized entities (e.g., an administrator). The web application may be configured to accept input of the additional requirements from one or more users. In response to input of the additional requirements, the underwriting module (100) may be configured to finally approve the financial request.

In one or more embodiments of the invention, the underwriting module (100) includes functionality to set one or more monetary limits related to the financial request. The underwriting module (100) may calculate a risk value for the financial request based on one or more indicators of potential risk (e.g., credit rating, geographic location of origin, requested approval amount, merchant-provided data, and/or any factors determined to affect a potential risk in approving the financial request). The underwriting module (100) may then set the monetary limit based on a mathematical function of the risk value. Alternatively, the underwriting module (100) may receive the risk value and/or monetary limit from a third party application. Examples of a monetary limit may include, but are not limited to, a maximum monthly transaction amount of a new merchant account, a maximum per transaction amount of a new merchant account, a maximum amount of a requested line of credit, and/or any other amount corresponding to the financial request.

In one or more embodiments of the invention, the financial institution (115) is any institution whose approval or notification is required in processing the financial request. Examples of a financial institution (115) may include, but are not limited to, a bank holding a financial account (e.g., merchant account (120)) of a seller, a recipient of a request to open a new merchant account, a payment intermediary service processing an online payment, a bank holding an account of a payer in a financial transaction, a consumer credit reporting agency, and/or any other entity with an interest in the financial request. In one or more embodiments of the invention, the financial institution (115) is capable of communicating with the underwriting module (100) by means of a server application. Thus, the server application of the financial institution (115) may receive data, including one or more notifications of approval/denial, from the underwriting module (100). The server application may also send requirements, approval criteria, predefined proximities, and/or other data to the underwriting module (100), in accordance with various embodiments of the invention. Thus, sending data to the financial institution (115) or receiving data from the financial institution (115) may involve the use of a server application or other computer software owned by, licensed to, or authorized by the financial institution (115).

In one or more embodiments of the invention, the merchant account (120) is a financial account of a merchant used to process payments from consumers or businesses to the merchant. The merchant account (120) may be operatively connected to a payment gateway or payment intermediary service and may be configured to hold merchant funds obtained from one or more payers in exchange for goods or services offered by the merchant. The payment gateway and/or payment intermediary service may be utilized with the merchant account (120) to process and/or receive payment from one or more payment types, such as, credit card, debit card, bank card, direct bank withdrawal, check, cash, payment network account (e.g., PayPal®, Intuit Payment Network®, etc.) and/or other payments. PayPal is a registered trademark of the PayPal Corporation (San Jose, Calif.) and Intuit Payment Network is a registered trademark of the Intuit Corporation (Mountain View, Calif.). In one or more embodiments of the invention, the financial institution (115) holds the merchant account (120). The merchant account (120) may be any data structure or grouping of data on a physical storage device (e.g., a hard disk) or a set of related storage devices. For example, the merchant account (120) may be a record or series of related records in a database of the financial institution (115).

In one or more embodiments of the invention, the underwriting repository (105) is a database or storage application residing on one or more servers. For example, the underwriting repository (105) may be a distributed database management system (DBMS) (or a component thereof), a clustered database, a standalone flat file, and/or any storage software residing on one or more physical storage devices. Examples of a storage device may include, but are not limited to, a hard disk drive, a tape drive, a redundant array of independent disks (RAID), and/or a solid state drive or memory device. Any type of database or storage application can be used, in accordance with various embodiments of the invention.

Figure 2:
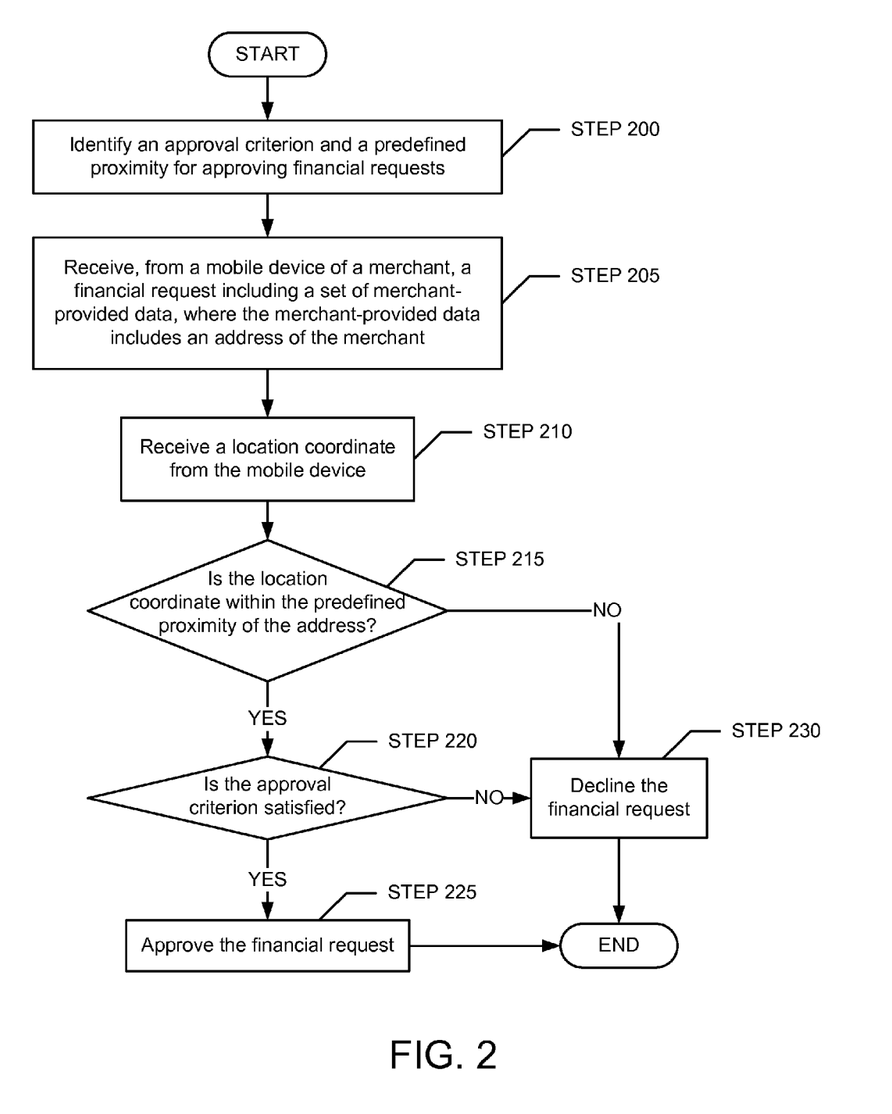
FIGS. 2 and 3 show flowcharts in accordance with one or more embodiments of the invention.

FIG. 2 shows a flowchart of a method for processing a financial request. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 2 should not be construed as limiting the scope of the invention.

In STEP 200, in one or more embodiments of the invention, an approval criterion and a predefined proximity for approving financial requests are identified. The approval criterion and predefined proximity may be received and/or defined by a user, an underwriting module (e.g., underwriting module (100) of FIG. 1, discussed above), and/or any other software application or entity in accordance with various embodiments of the invention.

In STEP 205, in one or more embodiments of the invention, a financial request including a set of merchant-provided data is received from a mobile device of a merchant. The merchant-provided data may include an address of the merchant. The financial request may be received from a merchant or a representative of a merchant using the mobile device and may be received by an underwriting module over a secure channel.

In STEP 210, in one or more embodiments of the invention, at least one location coordinate is received from the mobile device. The location coordinate(s) may be calculated or obtained by the mobile device and/or a component of the mobile device (e.g., a global positioning system (GPS) receiver) and received from the mobile device by an underwriting module over a secure connection.

In STEP 215, in one or more embodiments of the invention, it is determined whether the location coordinate is within the predefined proximity of the address. If the location coordinate is within the predefined proximity, the process proceeds to STEP 220. If the location coordinate is not within the predefined proximity, the process proceeds to STEP 230. Multiple calculations may be made, based on one or more approval criteria, in determining whether one or more location coordinates are within the predefined proximity. For example, an approval criterion may require that the multiple location coordinates are compared to one or more points defining a boundary of a merchant's address. In this example, initially, each location coordinate is compared to a point representing the merchant's address in order to calculate a distance. Then, continuing the example, an average of the distances is calculated. This average is then compared against the merchant's address (e.g., a point representing the merchant's address) to calculate a final distance.

In STEP 220, in one or more embodiments of the invention, it is determined whether the approval criterion is satisfied. If the approval criterion is satisfied, the process proceeds to STEP 225. If the approval criterion is not satisfied, the process proceeds to STEP 230. Determining whether the approval criterion is satisfied may include identifying one or more merchant-provided data items in the request. The approval criterion may include any number of requirements for the merchant-provided data. If all requirements are satisfied, it is determined that the approval criteria may be deemed to be satisfied.

In STEP 225, in one or more embodiments of the invention, the financial request is approved. Approving the financial request may include updating a record in an underwriting repository (e.g., underwriting repository (105) of FIG. 1, discussed above). In response to approving the request, a message may be sent notifying a financial institution, the mobile device, and/or another entity of the approval.

In STEP 230, in one or more embodiments of the invention, the financial request is declined. Declining the financial request may include flagging the request for a follow-up and/or sending a notification of denial to the mobile device or other device/entity.

Figure 3:
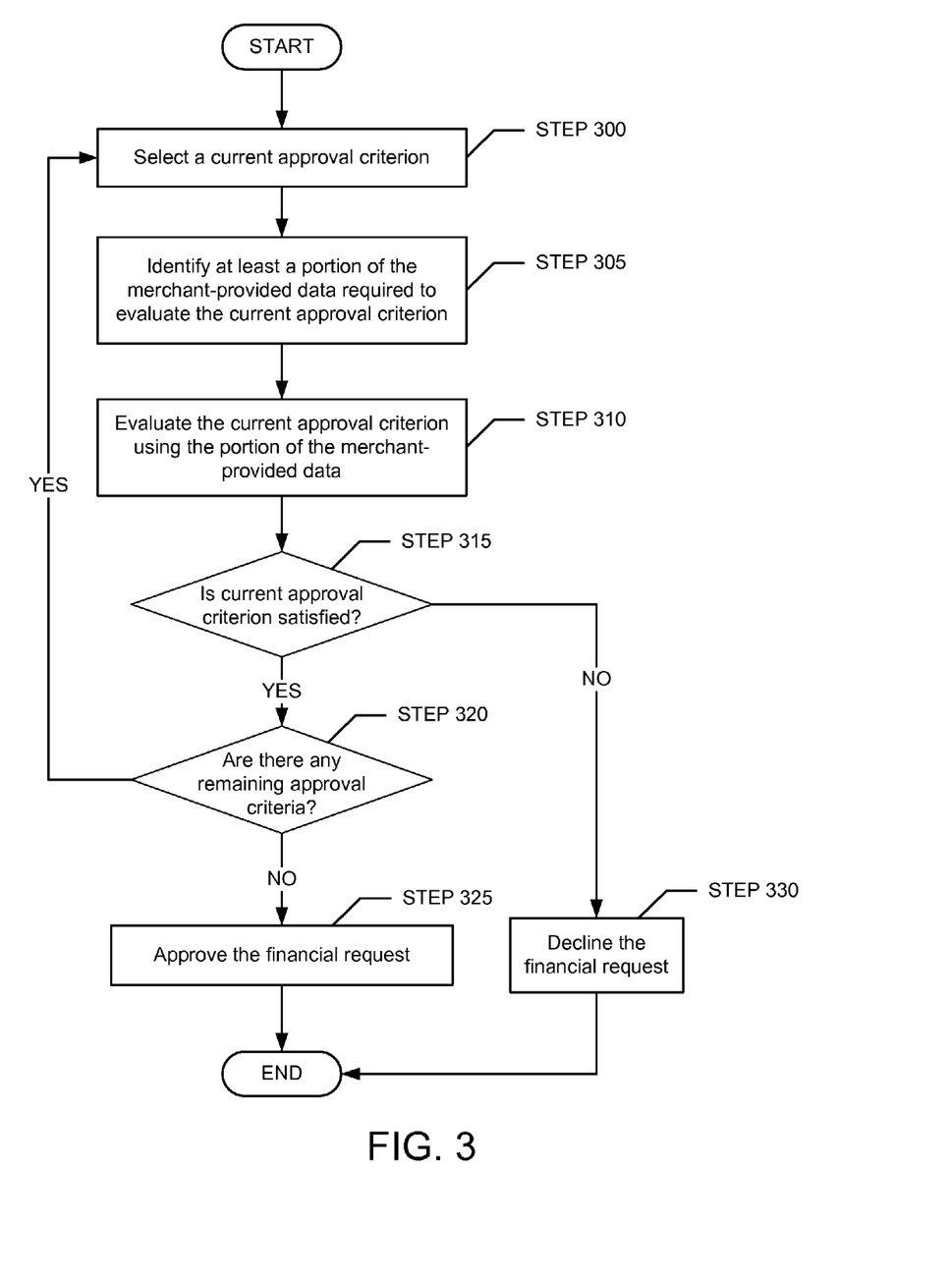

FIG. 3 shows a flowchart of a method for processing financial requests. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 3 should not be construed as limiting the scope of the invention.

In STEP 300, in one or more embodiments of the invention, a current approval criterion is selected. The current approval criterion may be selected from a list of one or more enabled and relevant approval criteria.

In STEP 305, in one or more embodiments of the invention, at least a portion of the merchant-provided data required to evaluate the current approval criterion is identified. Merchant-provided data may include data from a form (e.g., an application for a merchant account) populated by a user of the mobile device. Mobile device data (e.g., IP address, telephone number, cellular carrier) may also be required by the current approval criterion.

In STEP 310, in one or more embodiments of the invention, the current approval criterion is evaluated using the identified portion of the merchant-provided data. Evaluating the approval criterion may include comparing data obtained from the mobile device with one or more threshold data items.

In STEP 315, in one or more embodiments of the invention, it is determined whether the current approval criterion is satisfied. If the current approval criterion is satisfied, the process proceeds to STEP 320. If the current approval criterion is not satisfied, the process proceeds to STEP 330.

In STEP 320, in one or more embodiments of the invention, it is determined whether there are remaining approval criteria. If at least one remaining approval criterion exists, the process returns to STEP 300. If at least one remaining approval criterion does not exist, the process proceeds to STEP 325.

In STEP 325, in one or more embodiments of the invention, the financial request is approved. In response to approving the request, one or more notifications of the approval may be sent to any number of recipients (e.g., the mobile device). For example, a notification of the approval may be sent to a financial institution. In response, in this example, the financial institution creates a financial account and sends a message to the mobile device indicating that the account is created.

In STEP 330, in one or more embodiments of the invention, the financial request is declined. In response to declining the request, one or more notifications of the approval may be sent to any number of recipients.

The following section describes various examples of the invention. The examples are included to aid in the understanding of the invention but are not intended to limit the scope of the invention.

Figure 4A:
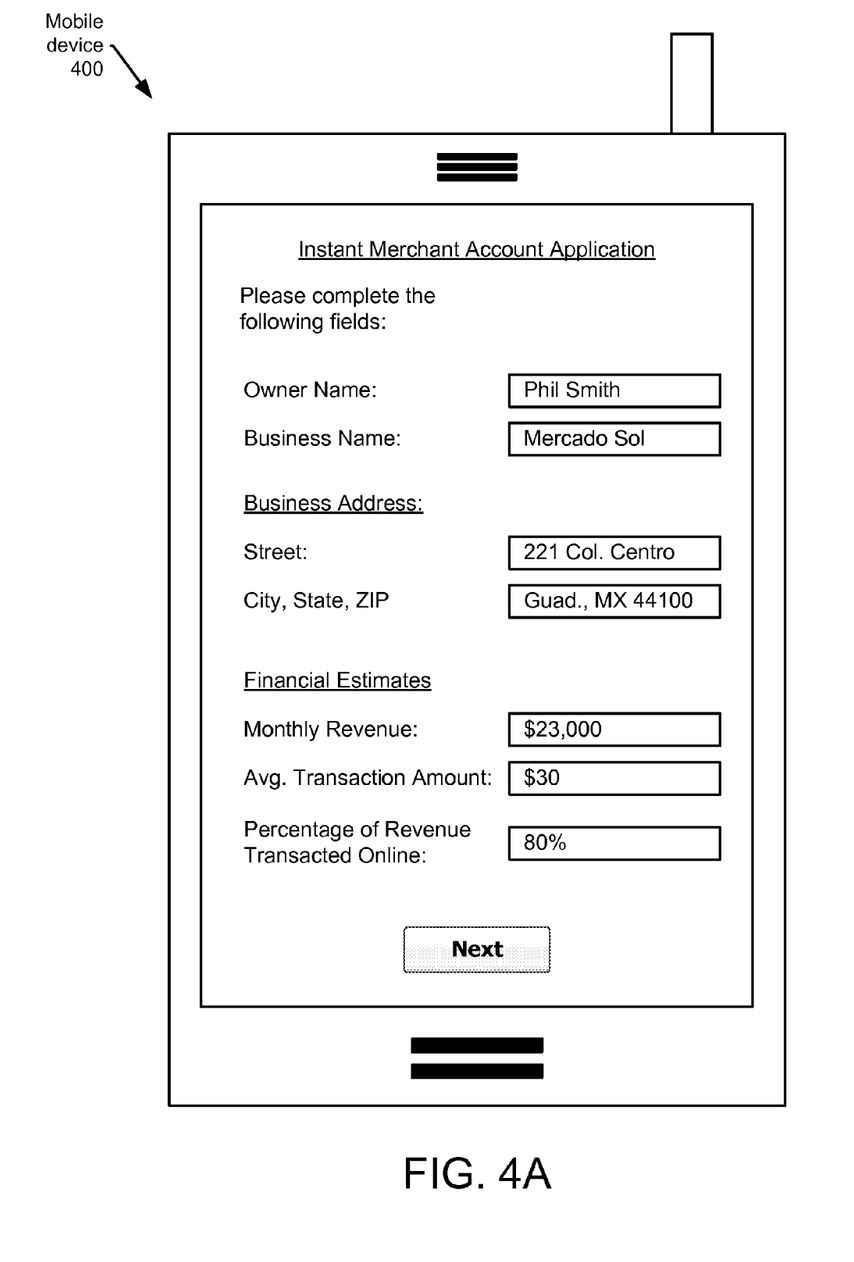
FIGS. 4A and 4B show exemplary screenshots of a mobile device in accordance with one or more embodiments of the invention.

FIG. 4A depicts an example screenshot of a mobile device (400) in accordance with one or more embodiments of the invention. In this example, a user intends to create a merchant account with a financial institution for a business he owns ("Mercado Sol"). The user downloads a mobile payment processing application from a mobile marketplace.

Continuing the example, the user launches the downloaded mobile payment processing application and an application form ("Instant Merchant Account Application") is displayed on the mobile device (400) as shown in FIG. 4A. The user proceeds to fill the requested information on the form and submits the form using a user interface of the mobile device (400). At this time, the mobile payment processing application obtains a set of GPS coordinates using a GPS receiver of the mobile device (400). The GPS coordinates are approximate location coordinates of the mobile device (400) taken within moments of the user submitting the form.

In response to the submission of the form, the mobile device (400) establishes an encrypted channel with a remote underwriting module executing on a server application of a fraud detection service provider. The mobile device (400) then generates a request to create the merchant account and sends the request to the underwriting module. In this example, the request includes merchant-provided data (i.e., data entered onto the application form) as well as mobile device (400) data (i.e., an internet protocol (IP) address and a telephone number of the mobile device (400)). In conjunction with the request, the mobile device (400) also sends the GPS coordinates to the underwriting module.

Continuing the example, the underwriting module receives the request and the GPS coordinates through a series of data transmissions over the encrypted channel. At this point, the underwriting module identifies five approval criteria stored within an underwriting repository residing on a distributed database management system (DBMS). The underwriting module determines that four of the five approval criteria are enabled and one is disabled. Of the four enabled approval criteria, the underwriting module determines that only three are applicable to requests for a new merchant account.

Continuing the example, the first approval criterion requires that the merchant address provided on the application form reside within 1000 feet (i.e., a predefined proximity) of the location of the mobile device (400). The second approval criterion requires that, if the request to open a new merchant account is for a merchant residing in a country outside of the United States, the maximum estimated monthly revenue amount should be less than $50,000. The third approval criterion requires that, if the merchant address is outside of the United States, no greater than 50% of the total revenue of the merchant should be transacted online.

In this example, the request lists the merchant address as residing in the country of Mexico, the monthly revenue estimate as $23,000, and the estimated percentage of revenue transacted online as 80% (see FIG. 4A). The underwriting module evaluates the first approval criterion by obtaining a coordinate representing the merchant-provided address from an external mapping application. The underwriting module calculates a distance of 232 feet between the location represented by the address coordinate and the location represented by the GPS coordinates received from the mobile device (400). Based on the distance being less than the predefined proximity, the underwriting module determines that the first approval criterion is satisfied.

Continuing the example, the underwriting module evaluates the second approval criterion. Based on the fact that the merchant-provided address is outside of the United States and the estimated monthly revenue is less than $50,000 (i.e., $23,000<$50,000), the underwriting module determines that the second approval criterion is satisfied. Then, the underwriting module proceeds to evaluate the third approval criterion.

The underwriting module compares the merchant provided estimate of "Percentage of Revenue Transacted Online" with the maximum amount of 50% defined by the third approval criterion. Based on the merchant-provided estimate exceeding the maximum defined by the third approval criterion, the underwriting module determines that the third approval criterion is not satisfied.

Figure 4B:
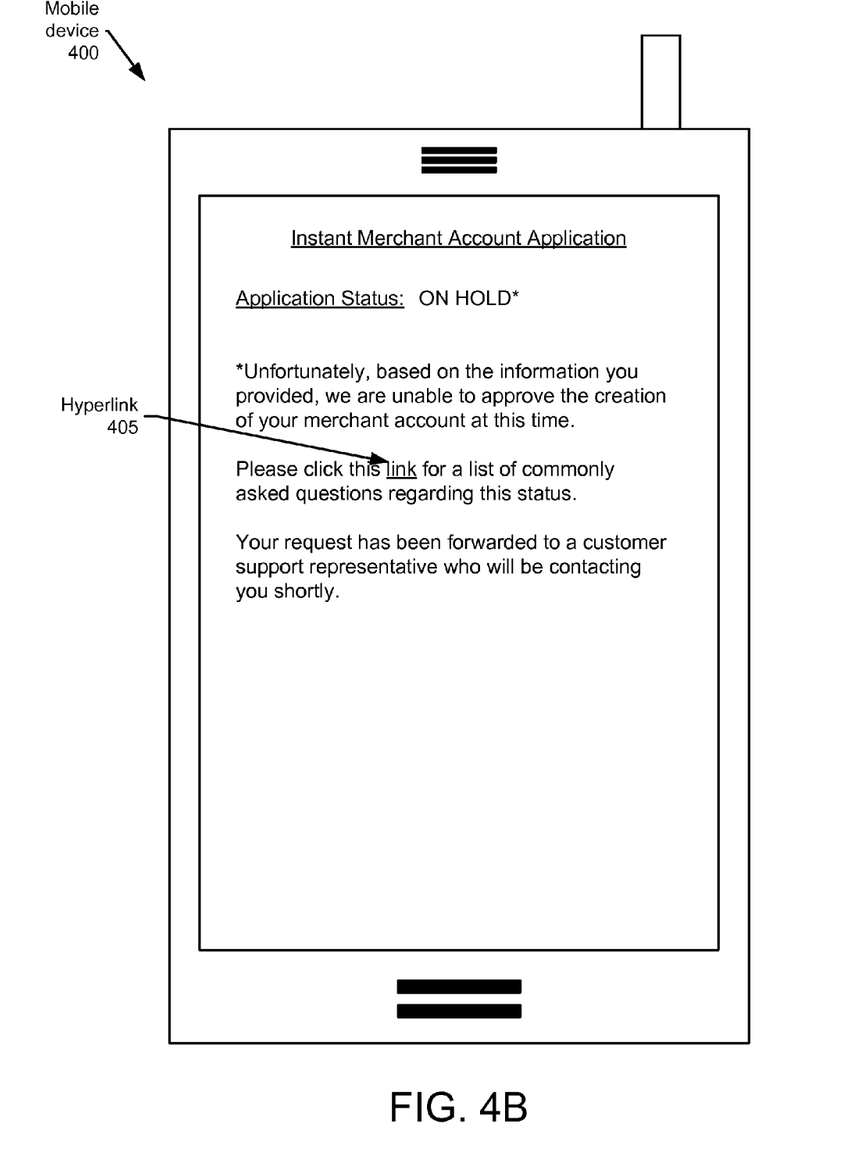

Continuing the example, the underwriting module identifies a rule associated with the third approval criterion. The rule requires that, if the third approval criterion is not satisfied, the request to create the new merchant account is flagged for a follow-up. In this example, this rule was created because the third approval criterion is a "soft" criterion. A soft criterion is any criterion which may be over-ridden manually upon examination of the application by a customer support representative. Thus, in response to the third approval criterion not being satisfied, the underwriting module declines the request and sends a notification to the mobile device (400) indicating that the request has been flagged for a follow-up with a customer support representative. FIG. 4B depicts a screenshot of the notification on a display screen of the mobile device (400).

Continuing the example, the notification includes a selectable hyperlink (405). In response to a selection of the hyperlink by the user, the mobile device (400) launches a web browser window displaying an in-depth explanation of the denial of the user's request.

Continuing the example, a customer support representative calls the business owner ("Phil Smith") on the mobile device (400) to offer a creation of a restricted merchant account in response to the approval criterion not being satisfied. The representative limits the per-transaction dollar amount for online transactions to a maximum of $20 and the representative limits the total online processing volume to $11,500, representing 50% of total allowable revenue to be transacted. The representative then proceeds to create the new restricted merchant account with Phil Smith's approval.

Figure 5:
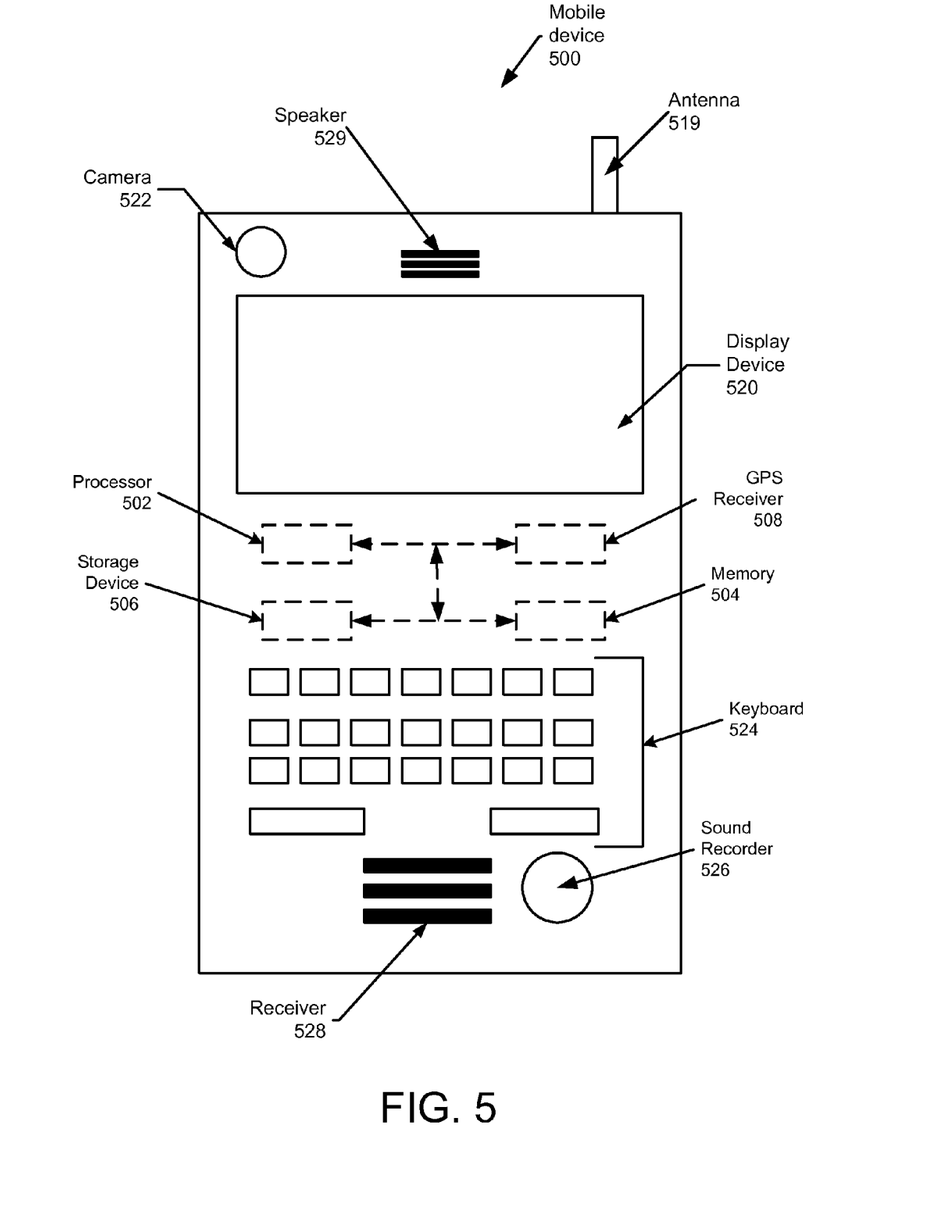
FIG. 5 shows a diagram of a mobile device in accordance with one or more embodiments of the invention.

Embodiments of the invention may be implemented on virtually any type of mobile device regardless of the platform being used. In one or more embodiments of the invention, the mobile device (500) includes any portable device that provides a user interface. Examples of mobile devices may include, but are not limited to, cellular phones, personal digital assistants, personal communicators, pagers, smart phones, or any other computing device. For example, as shown in FIG. 5, a mobile device (500) includes a processor (502), memory (504), a storage device (506), a GPS receiver (508), a speaker (529), a receiver (528), a keyboard (524), a sound recorder (526), a display device (520), a camera (522), and an antenna (519).

The mobile device (500) includes one or more processor(s) (502), associated memory (504) (e.g., RAM, cache memory, flash memory, etc.), a storage device (506) (e.g., a hard disk, an optical drive such as a compact disk drive or digital video disk (DVD) drive, a flash memory stick, etc.), a GPS receiver (508), and numerous other elements and functionalities typical of today's mobile devices (not shown). The mobile device (500) may include input means and output means, such as the keyboard (524), the receiver (528), and/or the display device (e.g., a liquid crystal display screen) (520), which permits a user to enter and/or display keystrokes including numeric, alphabetic, and other characters, images, or other media types. Other input devices may include a camera (522), a sound recorder (526), and/or other data recording mechanism. Those skilled in the art will appreciate that these input and output means may take other forms now known or later developed. Using embodiments of the present invention, a consumer may initiate an electronic funds transfer using the mobile device (500).

The mobile device (500) may be connected to a network (e.g., a local area network (LAN), a wide area network (WAN) such as the Internet, or any other similar type of network) via the antenna (519) or other network interface connection(s) (not shown). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (500) with a mobile device identifier of the mobile device (500).

In one or more embodiments of the invention, the network connection may be facilitated by a hardwired or other similar connection. For example, the network connection may involve a hardwire connection or short-range wireless connectivity technology with a second mobile device, a printing mechanism, a scanner, or a recording system.

Figure 6:
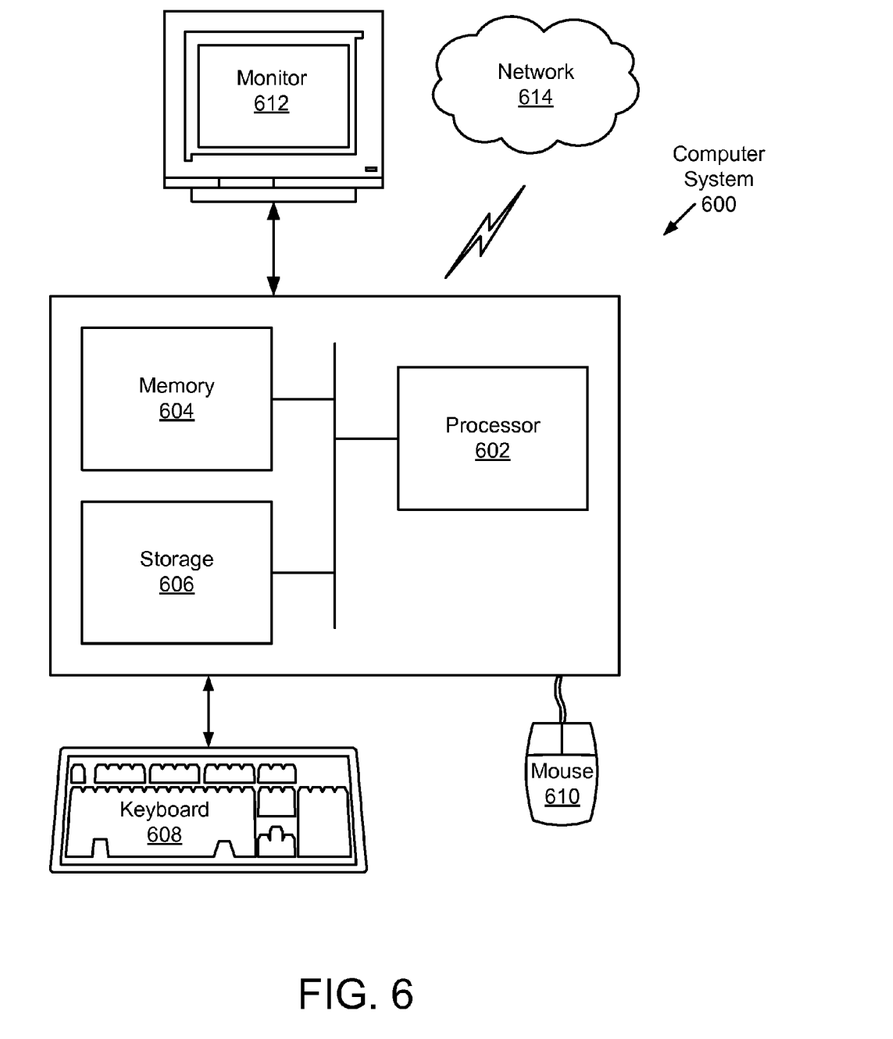
FIG. 6 shows a diagram of a computer system in accordance with one or more embodiments of the invention.

Embodiments of the invention may be implemented on virtually any type of computer regardless of the platform being used. For example, as shown in FIG. 6, a computer system (600) includes one or more processor(s) (602) (such as a central processing unit (CPU), integrated circuit, hardware processor, etc.), associated memory (604) (e.g., RAM, cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention (e.g., underwriting mobile (100), underwriting repository (105), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By determining whether a location coordinate of a merchant's mobile device is within a predefined proximity of the merchant's address, it may be possible to identify potentially fraudulent requests and to reduce the likelihood of approving a fraudulent request originating from a mobile device. Additionally, location coordinates may be utilized to block or deny requests from highly fraudulent areas, countries, users or industries.

Furthermore, by evaluating one or more approval criteria in order to approve a financial request, it may be possible to more accurately define potentially fraudulent requests and/or conditions for approving requests of various kinds. By modifying one or more approval criteria based on statistical fraud data, it may be possible to further decrease the occurrence of financial fraud.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing financial requests, comprising:
   obtaining an approval criterion and a predefined proximity to an address of a first merchant for approving financial requests, wherein the address of the first merchant is a place of business of the first merchant;
   receiving, from a first mobile device of the first merchant, a first financial request for creating a new merchant account, the first financial request comprising a plurality of merchant-provided data;
   receiving a plurality of location coordinates from the first mobile device of the first merchant, wherein at least one of the plurality of location coordinates from the first mobile device indicates that the first merchant is not located at the place of business of the first merchant;
   calculating, by a computer processor, a plurality of distances between the address of the first merchant and the plurality of location coordinates from the first mobile device;
   calculating, by the computer processor, an average of the plurality of distances;
   determining, by the computer processor, that the average is within the predefined proximity of the address of the first merchant;
   identifying, by the computer processor, at least a portion of the merchant-provided data required to evaluate the approval criterion;
   evaluating, by the computer processor, the approval criterion using the at least the portion of the merchant-provided data;
   determining, based on evaluating the approval criterion, that the approval criterion is satisfied; and
   creating, for underwriting, the new merchant account for the first merchant in response to determining that the average is within the predefined proximity and determining that the approval criterion is satisfied.

2. The method of claim 1, further comprising:
   receiving, from a second mobile device, a second financial request comprising an address of a second merchant;
   receiving a location coordinate from the second mobile device;
   determining that the location coordinate from the second mobile device is outside of the predefined proximity of the address of the second merchant; and
   declining the second financial request at least in response to determining that the location coordinate from the second mobile device is outside of the predefined proximity of the address of the second merchant.

3. The method of claim 2, further comprising:
   flagging the second financial request for a follow-up in response to declining the second financial request.

4. The method of claim 1, wherein the plurality of merchant-provided data is obtained from an application form submitted by the first merchant.

5. The method of claim 1, wherein the approval criterion is a requirement that a merchant-provided average transaction amount is less than a predefined maximum amount, and wherein determining that the approval criterion is satisfied comprises:
   identifying the merchant-provided average transaction amount in the plurality of merchant-provided data; and
   determining that the merchant-provided average transaction amount is less than the predefined maximum amount.

6. The method of claim 1, further comprising:
   calculating, based on the approval criterion and the plurality of merchant-provided data, a risk value for the first merchant; and
   setting, for the first merchant and based on the risk value, a maximum allowable dollar amount for transactions per unit time.

7. The method of claim 1, wherein the approval criterion is a requirement that a merchant-provided telephone number matches a telephone number of the mobile device, and wherein determining that the approval criterion is satisfied comprises:
   identifying the merchant-provided telephone number in the plurality of merchant-provided data; and
   determining that the merchant-provided telephone number matches the telephone number of the mobile device.

8. The method of claim 1, wherein the approval criterion is a requirement that a chargeback rate of the first merchant is less than a predefined maximum chargeback rate, and wherein determining that the approval criterion is satisfied comprises:
   identifying the chargeback rate of the first merchant; and
   determining that the chargeback rate of the first merchant is less than the predefined maximum chargeback rate.

9. The method of claim 1, wherein the approval criterion is a requirement that a name of the first merchant not reside within a blacklist of banned merchants, and wherein determining that the approval criterion is satisfied comprises:
   identifying the name of the first merchant in the plurality of merchant-provided data;
   searching the blacklist of banned merchants for the name of the first merchant; and
   determining that the name of the first merchant does not reside in the blacklist of banned merchants.

10. The method of claim 1, wherein a location coordinate of the plurality of location coordinates from the first mobile device is a global positioning system (GPS) coordinate obtained from a GPS receiver of the first mobile device.

11. The method of claim 1, wherein the approval criterion is based on one selected from a group consisting of a first requirement that the address of the first merchant reside outside of a predefined geographic location, a second requirement that a merchant-provided maximum cumulative transaction amount per unit time is less than a predefined maximum amount, a third requirement that a transaction type selected by the first merchant is not in a plurality of restricted transaction types, and a fourth requirement that a credit score of the first merchant is greater than a minimum allowable credit score.

12. A system for processing financial requests, comprising:
a computer processor upon execution of an underwriting module is configured to:
  obtain an approval criterion and a predefined proximity to an address of a first merchant for approving financial requests, wherein the address of the first merchant is a place of business of the first merchant;
  receive, from a first mobile device of the first merchant, a first financial request for creating a new merchant account, the first financial request comprising a plurality of merchant-provided data;
  receive a plurality of location coordinates from the first mobile device of the first merchant, wherein at least one of the plurality of location coordinates from the first mobile device indicates that the first merchant is not located at the place of business of the first merchant;
  calculate a plurality of distances between the address of the first merchant and the plurality of location coordinates from the first mobile device;
  calculate an average of the plurality of distances;
  determine that the average is within the predefined proximity of the address of the first merchant;
  identify at least a portion of the merchant-provided data required to evaluate the approval criterion;
  evaluate the approval criterion using the at least the portion of the merchant-provided data;
  determine, based on evaluating the approval criterion, that the approval criterion is satisfied; and
  create, for underwriting, the new merchant account for the first merchant in response to determining that the average is within the predefined proximity and determining that the approval criterion is satisfied.

13. The system of claim 12, further comprising:
a storage device configured to store an underwriting repository, comprising:
  a blacklist of banned merchants;
wherein the approval criterion is a requirement that a name of the first merchant not reside within the blacklist of banned merchants, and wherein the computer processor being configured to determine that the approval criterion is satisfied comprises the computer processor being configured to:
  identify the name of the first merchant in the plurality of merchant-provided data;
  search the blacklist of banned merchants for the name of the first merchant; and
  determine that the name of the first merchant does not reside in the blacklist of banned merchants.

14. The system of claim 12,
wherein the first mobile device comprises a global positioning system (GPS) receiver configured to obtain the plurality of location coordinates from the first mobile device.

15. The system of claim 12, wherein the computer processor upon execution of the underwriting module is further configured to:
receive, from a second mobile device, a second financial request comprising an address of a second merchant;
receive a location coordinate from the second mobile device;
determine that the location coordinate from the second mobile device is outside of the predefined proximity of the address of the second merchant; and
decline the second financial request at least in response to determining that the location coordinate from the second mobile device is outside of the predefined proximity of the address of the second merchant.

16. The system of claim 15, wherein the computer processor upon execution of the underwriting module is further configured to:
flag the second financial request for a follow-up in response to declining the second financial request.

17. The system of claim 12, wherein the plurality of merchant-provided data is obtained from an application form submitted by the first merchant.

18. The system of claim 12, wherein the first financial request is a request for approval of a financial transaction between the first merchant and one selected from a group consisting of a consumer and a business.

19. The system of claim 12, wherein the approval criterion is a requirement that a chargeback rate of the first merchant is less than a predefined maximum chargeback rate, and wherein the computer processor being configured to determine that the approval criterion is satisfied comprises the computer processor being configured to:
identify the chargeback rate of the first merchant; and
determine that the chargeback rate of the first merchant is less than the predefined maximum chargeback rate.

20. The system of claim 12, wherein the approval criterion is based on one selected from a group consisting of a first requirement that the address of the first merchant reside outside of a predefined geographic location, a second requirement that a merchant-provided maximum cumulative transaction amount per unit time is less than a predefined maximum amount, a third requirement that a transaction type selected by the first merchant is not in a plurality of restricted transaction types, and a fourth requirement that a credit score of the first merchant is greater than a minimum allowable credit score.

21. A non-transitory computer-readable storage medium storing a plurality of instructions, executable by a computer processor, for processing financial requests, the plurality of instructions comprising functionality to:
obtain an approval criterion and a predefined proximity to an address of a first merchant for approving financial requests, wherein the address of the first merchant is a place of business of the first merchant;
receive, from a first mobile device of the first merchant, a first financial request for creating a new merchant account, the first financial request comprising a plurality of merchant-provided data;
receive a plurality of location coordinates from the first mobile device of the merchant, wherein at least one of the plurality of location coordinates from the first mobile device indicates that the first merchant is not located at the place of business of the first merchant;
calculate a plurality of distances between the address of the first merchant and the plurality of location coordinates from the first mobile device;
calculate an average of the plurality of distances;
determine that the average is within the predefined proximity of the address of the first merchant;
identify at least a portion of the merchant-provided data required to evaluate the approval criterion;

evaluate the approval criterion using the at least the portion of the merchant-provided data;

determine, based on evaluating the approval criterion, that the approval criterion is satisfied; and create, for underwriting, the new merchant account for the first merchant in response to determining that the average is within the predefined proximity and determining that the approval criterion is satisfied.

22. The non-transitory computer-readable storage medium of claim 21, wherein the plurality of instructions further comprise functionality to:

receive, from a second mobile device, a second financial request comprising an address of a second merchant;

receive a location coordinate from the second mobile device;

determine that the location coordinate from the second mobile device is outside of the predefined proximity of the address of the second merchant; and decline the second financial request at least in response to determining that the location coordinate from the second mobile device is outside of the predefined proximity of the address of the second merchant.

23. The non-transitory computer-readable storage medium of claim 22, wherein the plurality of instructions further comprise functionality to:

flag the second financial request for a follow-up in response to declining the second financial request.

24. The non-transitory computer-readable storage medium of claim 21, wherein the plurality of merchant-provided data is obtained from an application form submitted by the first merchant.

* * * * *